US011209282B2

(12) United States Patent
Woo et al.

(10) Patent No.: US 11,209,282 B2
(45) Date of Patent: Dec. 28, 2021

(54) VEHICLE CLEANLINESS DETECTION AND CARWASH RECOMMENDATION

(71) Applicant: Ford Global Technologies, LLC, Dearborn, MI (US)

(72) Inventors: Jason Joseph Woo, Northville, MI (US); Jae Hyung Lim, Canton, MI (US); James Issac, Ypsilanti, MI (US); Jeremy Lerner, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 321 days.

(21) Appl. No.: 16/460,490

(22) Filed: Jul. 2, 2019

(65) Prior Publication Data

US 2021/0003413 A1 Jan. 7, 2021

(51) Int. Cl.

| G01C 21/34 | (2006.01) |
|---|---|
| B60Q 9/00 | (2006.01) |
| G01C 21/36 | (2006.01) |
| G06Q 30/02 | (2012.01) |
| G06T 7/00 | (2017.01) |
| B60R 11/04 | (2006.01) |
| H04L 29/08 | (2006.01) |

(Continued)

(52) U.S. Cl.
CPC .......... *G01C 21/3484* (2013.01); *B60Q 9/00* (2013.01); *B60R 11/04* (2013.01); *G01C 21/3446* (2013.01); *G01C 21/3602* (2013.01); *G01C 21/3617* (2013.01); *G01C 21/3644* (2013.01); *G01C 21/3679* (2013.01); *G06Q 30/0282* (2013.01); *G06T 7/0002* (2013.01); *H04N 7/183* (2013.01); *G06F 3/0482* (2013.01); *G06T 2207/30168* (2013.01); *G06T 2207/30252* (2013.01); *H04L 67/10* (2013.01)

(58) Field of Classification Search
CPC ............ G01C 21/3484; G01C 21/3697; G01C 21/3605; G01C 21/3476; G01C 21/3629; G01C 21/3446; G01C 21/3602; G01C 21/3617; G01C 21/3679; G01C 21/3644; B60Q 9/00; G06Q 30/0282; H04N 7/183; B60R 11/04; G06F 3/0482; H04L 67/12; H04L 67/10; G06T 7/0004; G06T 7/0002; G06T 2207/30168; G06T 2207/30252; G01N 21/94; G01N 2021/945
See application file for complete search history.

(56) References Cited

U.S. PATENT DOCUMENTS

| 9,671,230 B2 | 6/2017 | Sahay et al. |
| 9,805,519 B2 * | 10/2017 | Ramanujam ......... G05D 1/0225 |
| 10,112,585 B1 | 10/2018 | Tokatyan |

(Continued)

FOREIGN PATENT DOCUMENTS

CN 111684487 A * 9/2020 ............... H04N 7/18

*Primary Examiner* — Kelly D Williams
(74) *Attorney, Agent, or Firm* — Michael Spenner; Brooks Kushman P.C.

(57) ABSTRACT

A vehicle includes a camera configured to capture an image; and a controller programmed to analyze quality of the image to calculate a lens cleanliness, responsive to detect the lens cleanliness being below a predefined threshold, identify a carwash station within a predefined distance from a navigation route, indicate the carwash station to a vehicle user, and responsive to receiving user input selecting the carwash station, set the carwash station as a navigation destination.

18 Claims, 5 Drawing Sheets

(51) Int. Cl.
*G06F 3/0482* (2013.01)
*H04N 7/18* (2006.01)

(56) References Cited

U.S. PATENT DOCUMENTS

| | | | |
|---|---|---|---|
| 2018/0096474 A1* | 4/2018 | Guerreiro | G06T 7/0002 |
| 2018/0267903 A1* | 9/2018 | No | G06F 3/0623 |
| 2018/0364728 A1* | 12/2018 | Yaldo | G05D 1/0088 |
| 2019/0164271 A1* | 5/2019 | Herchenbach | G06K 9/00791 |

* cited by examiner

Carwash Preference — 210

302 — Distance :  2 blocks from route/destinate

304 — Technology :  ☑ Automatic
 ☑ Touchless
 ☐ Manual
 ☐ Self

306 — Waiting time :  3 minutes or less

308 — Other services :  ☑ Stand-alone
 ☑ Gas station
 ☑ Grocery shop

310 — Rating :  4.5 or up

312 — Calendar access :  Allowed

314 — Incentives :  ☑ Coupon
 ☑ Gas credit

VEHICLE CLEANLINESS DETECTION AND CARWASH RECOMMENDATION

TECHNICAL FIELD

The present disclosure generally relates to vehicle cleanliness detection using a camera. More specifically, the present disclosure relates to recommending a carwash based on carwash preferences and incentives.

BACKGROUND

Vehicles are often exposed to dirty environmental conditions (e.g. salt, snow, mud, and dirt) that can cover vehicle exterior surfaces including sensors and cameras, causing inconvenience. A vehicle user may subjectively judge the cleanliness/dirtiness of a vehicle and decide when and where to wash the vehicle. There may be inconsistency in subjective cleanliness/dirtiness judgment between different users. Additionally, the decision made by the user on when and where to wash the vehicle is usually not optimized. For instance, there may be a long line at the particular carwash chosen by the user, while another carwash nearby has a shorter line and offers more incentives.

SUMMARY

In one or more illustrative embodiments of the present disclosure, a vehicle includes a camera configured to capture an image; and a controller programmed to analyze quality of the image to calculate a lens cleanliness, responsive to detect the lens cleanliness being below a predefined threshold, identify a carwash station within a predefined distance from a navigation route, indicate the carwash station to a vehicle user, and responsive to receiving user input selecting the carwash station, set the carwash station as a navigation destination.

In one or more illustrative embodiments of the present disclosure, a system for a vehicle includes a camera having a lens exterior to the vehicle, configured to capture images through the lens; a telematics control unit (TCU) configured to communicate with a server via a wireless connection; and one or more processors configured to responsive to receiving images from the camera, analyze a quality of the images to calculate a lens cleanliness value, responsive to detect the lens cleanliness value being below a predefined threshold, identify a plurality of carwash stations within a predefined distance from a navigation route, download status of the carwash stations as identified from the server via the TCU, select the carwash station as identified by matching a carwash preference with status of the carwash stations, responsive to finding a match, indicate the carwash station as selected to a vehicle user, and responsive to receiving user input selecting the carwash station, set the carwash station as a navigation destination.

In one or more illustrative embodiments of the present disclosure, a method for a vehicle includes the following. Start a timer that is responsive to detecting the vehicle's arrival at a carwash station set as a navigation destination; capturing images via a camera exterior to vehicle cabin; a system that is responsive to detecting a calculated lens cleanliness is above a predefined threshold, which indicates a carwash has been performed; measuring a service time elapsed since the vehicle arrival at the carwash station; and report the service time to a data server via a TCU through a wireless connection.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a vehicle system for recommending carwashes. More specifically, the present disclosure proposes a vehicle system for detecting vehicle cleanliness via a camera and recommending carwashes based on user preference.

The present disclosure proposes a vehicle to use vehicle cameras to detect severity of vehicle cleanliness quality using methods of image formations. The cameras may include front-facing and/or rear-facing (e.g. a backup) camera located outside the vehicle cabin subject to outside environment. Images captured by the camera may be processed and analyzed to determine the quality of image irradiance by evaluating attenuation and intensification metrics for instance. The vehicle may suggest the need for an exterior wash to a user based on camera image quality metrics.

Carwash station locations may be stored in a map database. Vehicles may be further configured to report and receive carwash information using crowdsource technologies. For instance, a vehicle may measure waiting time of a particular carwash station and report the waiting time to a server to share with other vehicles. Additionally, the vehicle may share incentives of a carwash station (e.g. promotion, coupon) with other vehicles. Carwash preference may be provided by a user to further evaluate the recommendation. For instance, if a user only washes the vehicle at carwashes attached to grocery stores or gas stations, the vehicle system may be configured not to recommend standalone carwash businesses.

Figure 1:
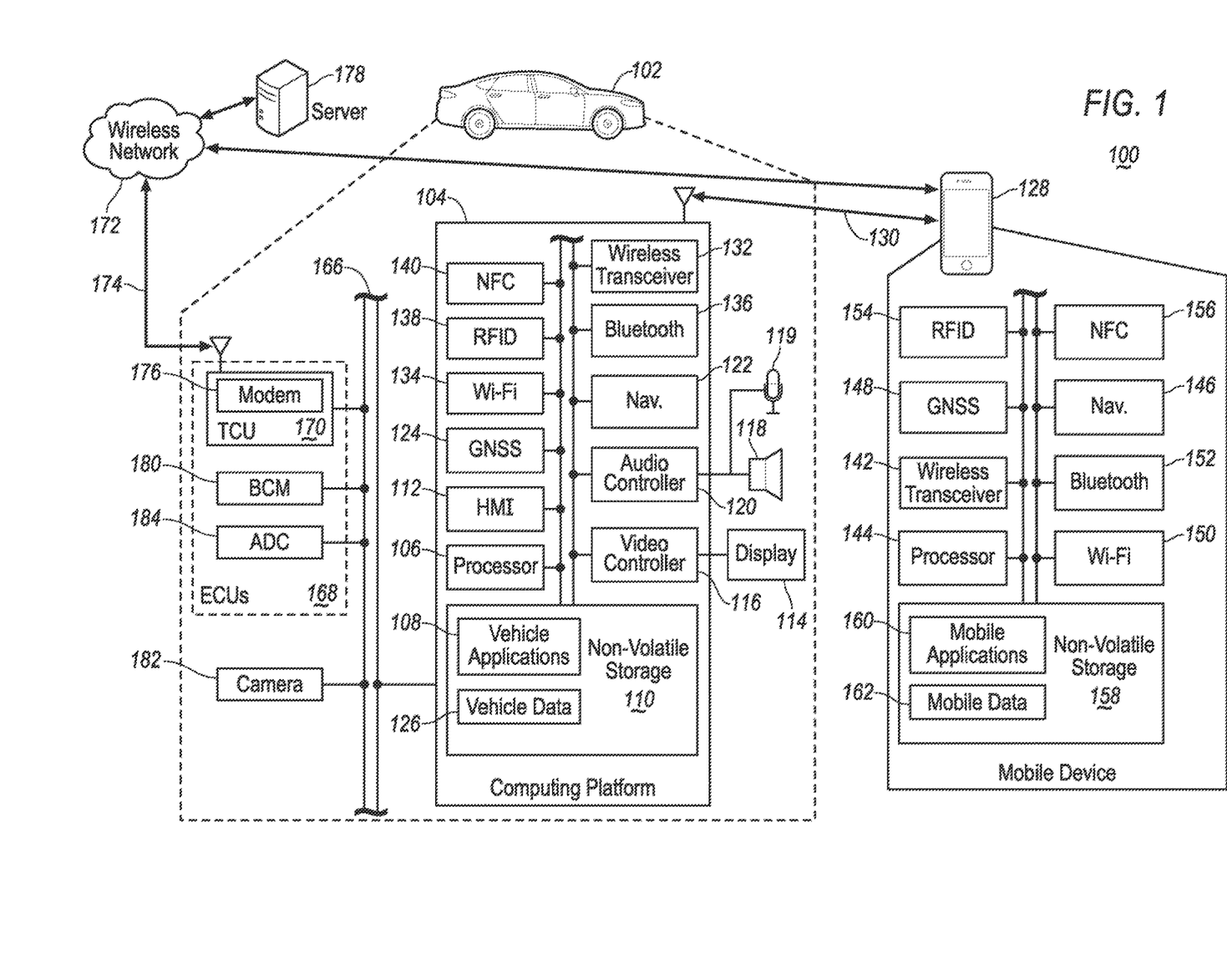
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, vehicle data collection, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 and microphones 119 configured to provide audio output and input to/from vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as a part of the vehicle applications 108.

The computing platform 104 may be configured to wirelessly communicate with a mobile device 128 of the vehicle users/occupants via a wireless connection 130. The mobile device 128 may be any of various types of portable computing device, such as cellular phones, tablet computers, wearable devices, smart watches, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples.

The computing platform 104 may be configured to communicate with various ECUs 168 of the vehicle 102 configured to perform various options. For instance, the computing platform may be configured to communicate with a TCU 170 configured to control telecommunication between vehicle 102 and a wireless network 172 through a wireless connection 174 using a modem 176. The wireless connection 174 may be in the form of various communication network e.g. a cellular network. Through the wireless network 172, the vehicle may access one or more servers 178 to access various content for various purposes. It is noted that the term wireless network is used as a general term in the present disclosure and may include any computing network involving carriers, router, computers, controllers or the like configured to store data and perform data processing functions and facilitate communication between various entities.

The ECUs 168 may further include a body control module (BCM) 180 configured to manage and control various body operations of the vehicle 102. For instance, the BCM 180 may be configured to control operations of doors, window, lighting using data from various sensors (not shown) of the vehicle 102. The BCM 180 may be further in communication with a camera 182 configured to capture images of a vicinity of the vehicle 102. The camera 182 may be preferably a front-facing or a rear-facing camera located outside the vehicle cabin and subject to outside environment (e.g. snow, dirt and etc.). Alternatively, the camera 182 may be located inside the vehicle cabin behind a windshield facing outward to capture images through the windshield. In this case, the camera 82 may be located at an area of windshield beyond the wipers reach (e.g. corner of the windshield) to capture an accurate cleanliness/dirtiness of the windshield. Images captured by the camera 182 may be processed by the computing platform 104 using software as one of vehicle applications. For instance, the computing platform 104 may analyzed and process images received from the camera 182 using image processing algorithms to evaluate how much dirt is on the camera lens/windshield, so as to determine a vehicle cleanliness/dirtiness value. The ECUs 168 may further include an autonomous driving controller (ADC) 184 configured to provide autonomous driving features to the vehicle 102.

Figure 2:
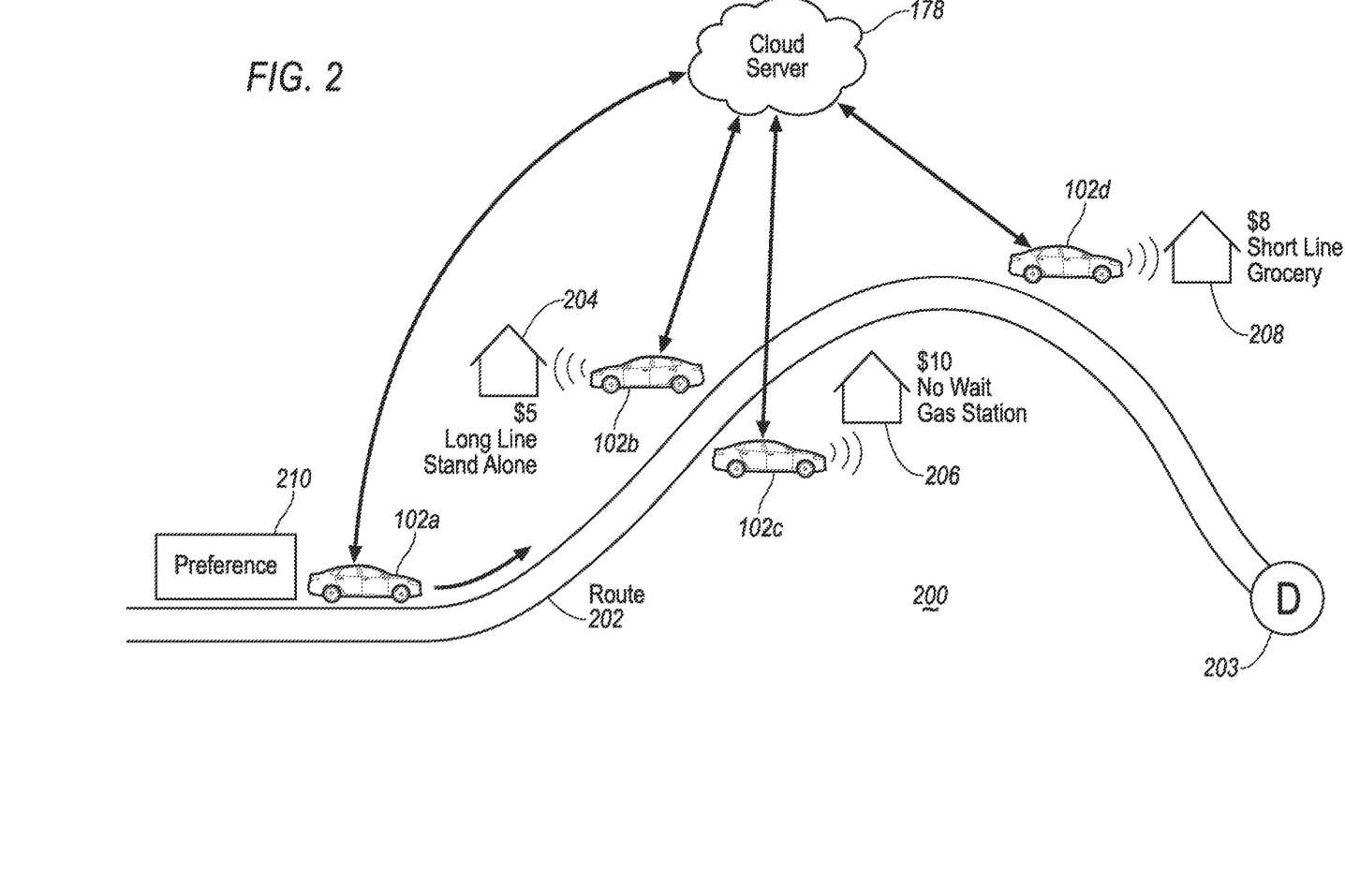
FIG. 2 illustrates an example schematic diagram of the vehicle system of one embodiment of the present disclosure.

Referring to FIG. 2, an example schematic diagram 200 for a vehicle system of one embodiment of the present disclosure is illustrated. With continuing reference to FIG. 1, a vehicle 102a in communication with cloud server 178 traverses a route 202 to a destination 203. The route 202 and/or destination 203 may be planned by the navigation controller 122 of the computing platform 104 and traversed autonomously by the ADC 184 in case the vehicle 102 is provided with such feature. Additionally or alternatively, the route 202 and/or destination 203 may be a predicted route based on traveling history with data collected by the GNSS controller 124. Additionally or alternatively, the route 202 and/or destination 203 may be predicted based on a calendar/schedule of a user associated with the vehicle with data from the cloud 178 or from the mobile device 128. For illustrative purposes, multiple fleet vehicles 102b, 102c, 102d may be connected to the cloud server 178 and provided with crowdsource data sharing features. The term fleet vehicle is used as a general term in the present disclosure and may refer to any vehicles provided with crowdsource data sharing features.

A first fleet vehicle 102b may at a first carwash station 204 and report the current status of the first carwash station 204 along the route 202 to the server 178. For instance, the current carwash price may be $5 and there is a long line (e.g. about five minutes) at the first carwash station 204. Additionally, the first carwash station 204 may be recorded at a map database (e.g. vehicle data 126) of the vehicle 102 as a stand-alone carwash service. Pricing information of the first station 204 may be collected by a camera 182 of the first fleet vehicle 102b. Additionally or alternatively, a user of the first fleet vehicle 102b may manually input the price to the vehicle system to report. In case that the fleet vehicle 102b is provided with wireless payment features (e.g. via the NFC controller 140 or mobile device 128 of the user), the vehicle 102b may automatically collect and report the price information to the server 178. Additionally or alternatively, the carwash station 204 may report the carwash price to the server 178 without the help from the fleet vehicle 102b.

A second fleet vehicle 102c report status data of a second carwash station 206 along the route 202 to the server 178. The second carwash station 206 may be attached to a fueling station (e.g. a gas station) as an example. The current status of the second carwash station 206 may be $10 for an average wash and there is no waiting time. Similarly, a third fleet vehicle 102d may be at a third carwash station 208 attached to a grocery store along the route 202. The third fleet vehicle 102d may report the current status of the third carwash station 208 to be $8 for a wash and short line waiting (e.g. about one minute). Additionally, each station may provide car wash incentives to attract business. Depending on the specific configuration of the stations, different incentive may be offered. As a few non-limiting examples, the incentives may include cash back offer, coupons for next service, fueling credit, grocery purchase coupon/credit or etc.

Responsive to detecting a wash is needed by analyzing the image captured by the camera 182, the computing platform 104 of the vehicle 102 may recommend one or more carwash stations within a predefined distance (e.g. two blocks or 200 meters) from the route 202. In the present example, assuming all three carwash stations are within the predefined distance, the computing platform 104 may qualify all of the three stations as candidates. The computing platform 104 may further use a carwash preference 210 to select one or more station to recommend. The carwash preference 210 may include various characteristics set by the user to better select carwash stations to serve the preferences of the user. For instance, the carwash preference 210 may include types of services such as stand-alone, gas station, attached to grocery or the like as a factor to recommend to the user. For instance, if the user selects gas station as a preference, the computing platform 104 may prioritize the second carwash station 206 over the others. The carwash preference 210 may be stored in the storage 110 of the computing platform 104. Additionally or alternatively, the user may use the mobile device 128 to store and/or modify the preference 210.

Figure 3:
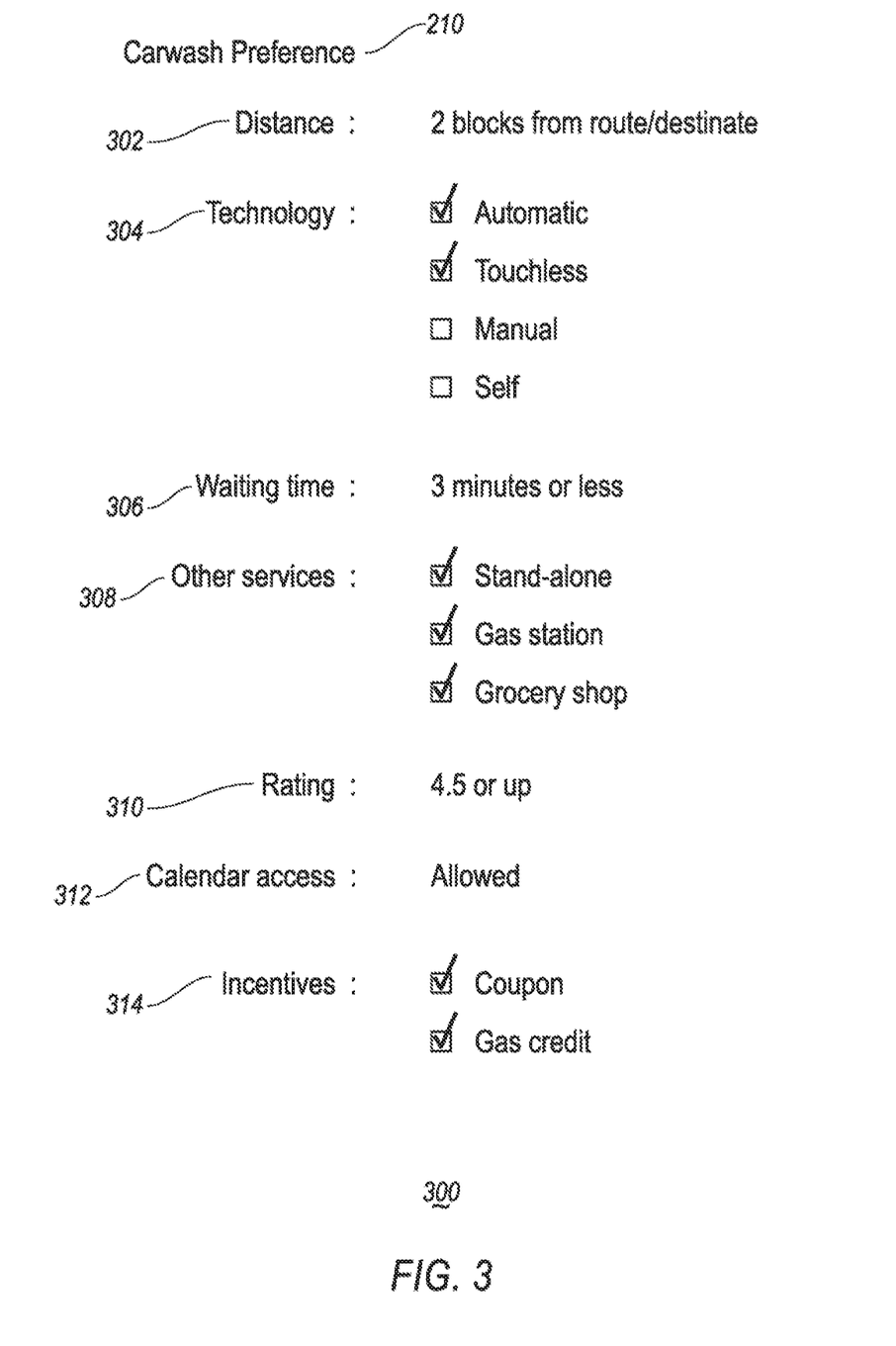
FIG. 3 illustrates an example diagram of the carwash preference of one embodiment of the present disclosure.

Referring to FIG. 3, an example diagram for the carwash preference of one embodiment of the present disclosure is illustrated. With continuing reference to FIGS. 1 and 2, the carwash preference 210 associated with the vehicle 102 and/or the user of the vehicle 102 may include various entries used for carwash station recommendations. As a few non-limiting example, the carwash preference may include a distance entry 302 configured to set a maximum distance between a candidate station and the route 202 or destination 203 described with reference to FIG. 2. In the present example, the property for the distance entry is two blocks from the route or destination, which indicates all candidate carwash stations are preferably within two blocks from the route 202 or destination 203. The carwash preference 210 may further include a washing technology entry 304 configured to specify the technology used (or type of wash). The technology entry 304 may include one or more options such as automatic wash, touchless wash, manual wash, or self-wash for a user to choose from based on his/her preference.

The carwash preference 210 may further include a waiting time entry 306 indicative of a maximum time the user would like to wait. As an example, if the waiting time entry 306 may be set to three minutes or less as illustrated, the computing platform 104 may only recommend candidate stations having a line within three minutes. The current or predicted waiting time at a particular candidate carwash station may be received from a cloud server 178. As discussed above with reference to FIG. 2, the current waiting time status of one or more candidate stations may be reported by fleet vehicles 102 using crowdsource technology to the server 178. Additionally, the server 178 may be further configured to predict the waiting time for a candidate station based on historic data. The carwash preference 210 may further include an entry for other services 308 indicative other services provided by the carwash station favored by the user. For instance, the other services may include various options such as stand-alone station, attached to gas station, or attached to grocery shop allowing a user to select. Some user may prefer to fill-up the gas tank at carwash, while others may prefer to do grocery shopping and carwash at one stop.

The carwash preference 210 may further include a customer rating entry 310 allowing the user to choose a carwash station based on customer rating scores. For instance, if a user set the property of the customer rating entry 310 to be "4.5 or up," the computing platform may only recommend stations with at least 4.5 rating score. The rating score may be reported by each user of fleet vehicles after carwash under the same crowdsource system. Additionally or alternatively, the server 178 may be configured to obtain rating scores from publicly available sources such as Google® reviews. The carwash preference 210 may further include a calendar access permission entry 312 configured to allow the computing platform 104 to access calendar information of the user for carwash recommendation purposes. For instance, if the user allows the system to access to his/her calendar, the computing platform 104 may use the calendar information (e.g. meeting time/location) to plan the route 202 and destination 203. The carwash preference 210 may further include an incentive entry 314 configured to allow the computing platform 104 to choose candidate stations based on incentives currently offered. For instance, the incentive entry 314 may include coupons, gas credits or the like as a few non-limiting examples.

Figure 4:
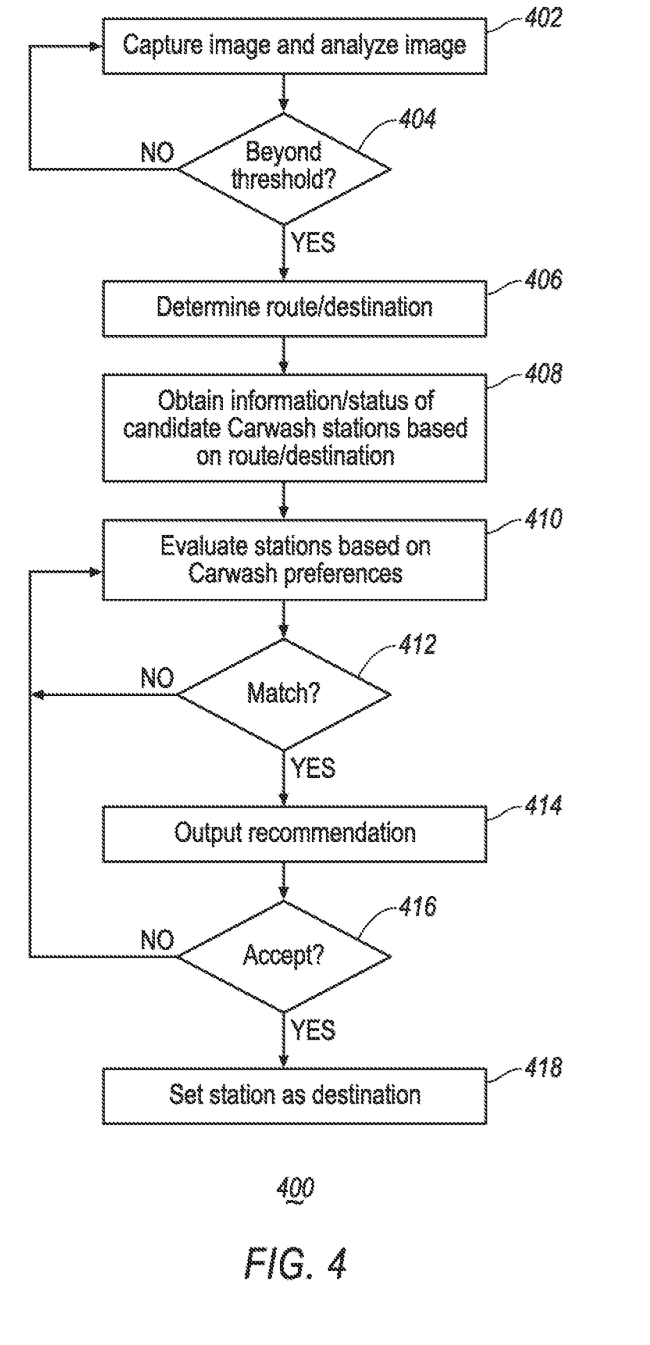
FIG. 4 illustrates an example flow diagram for a carwash recommending process of one embodiment of the present disclosure.

Referring to FIG. 4, an example flow diagram for a carwash recommending process 400 of one embodiment of the present disclosure is illustrated. With continuing reference to FIGS. 1 to 3, at operation 402 the camera 182 captures an image and sends to the computing platform 104 for processing. The computing platform 104 may be configured analyze the quality of image irradiance by evaluating attenuation and intensification metrics for instance to determine the cleanliness of the camera, as well as of the vehicle exterior body. At operation 404, the computing platform 104 verifies if the vehicle cleanliness is beyond (i.e. below) a predefined threshold. If the answer is a no indicating the vehicle 102 is still clean, the process returns to operation 402. Otherwise, if the vehicle cleanliness is below the threshold indicating a carwash is recommended, the process proceeds to operation 406, and the computing platform 104 determines a route 202 and/or a destination 203. As discussed above with reference to FIG. 3, the route 202 and/or destination 203 may be calculated based on user input, historic travel data, user calendar or other data associated with the vehicle 102 or the user of the vehicle 102.

At operation 408, the computing platform 104 identifies one or more candidate carwash stations based on the route 202 and/or destination 203 as determined, and obtains information/status of the candidate stations from the server 178. For instance, the computing platform 104 may use the distance entry 302 of the carwash preference 210 to identify candidate stations within the predefined distance of the route 202 and/or destination 203. At operation 410, the computing platform 104 evaluates one or more candidate stations identified based on the station status and the carwash preference 210 to search for a match. If a candidate station does not meet the preference of the vehicle, the process returns from operation 412 to operation 410 and the computing platform 104 continues to search for a next candidate. Otherwise, the process proceeds to operation 414 and the computing platform 104 outputs a recommendation message to the user via the HMI controller 112. For instance, the computing platform 104 may output the recommendation message including location and status (e.g. waiting time, price, incentives and etc.) of one or more carwash stations via the display 114 and as the user to confirm the recommendation. If the user does not accept the recommendation, the process returns from operation 416 to operation 410 to continue searching for other candidate stations. Otherwise, if the user input indicates an acceptance of the recommendation, the process proceeds to operation 418 and the computing platform 104 sets the selected carwash station to be the navigation destination. In case the vehicle 102 is provided with autonomous driving features, the computing platform 104 may further operate the vehicle 102 to the destination autonomously via the ADC 184.

Figure 5:
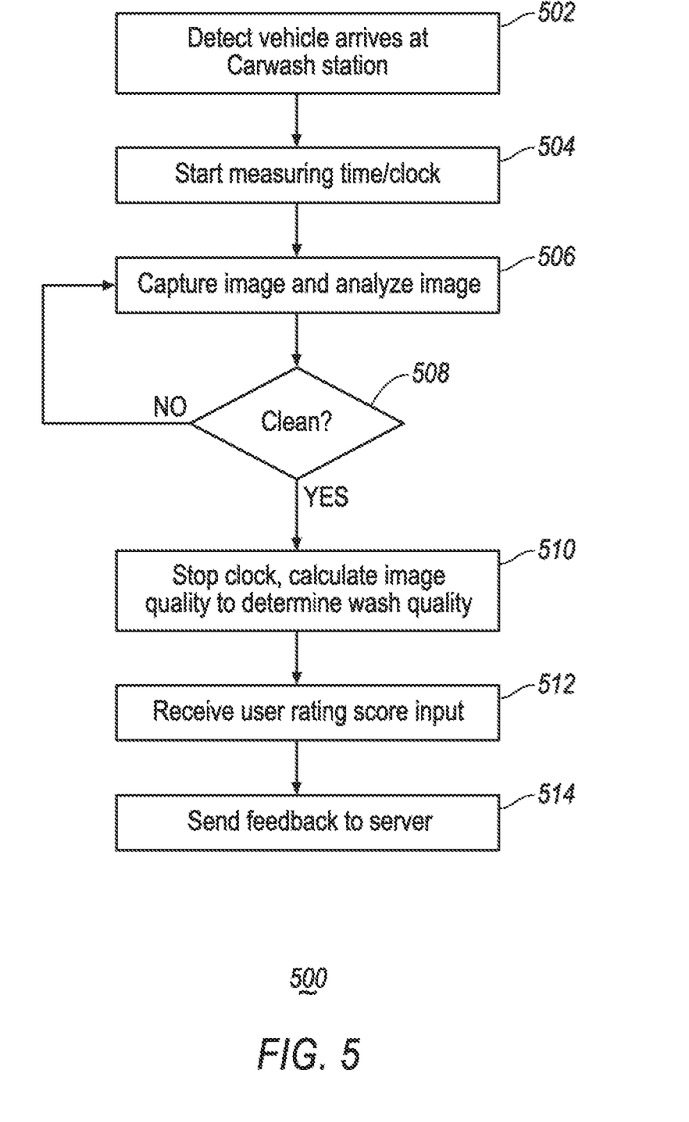
FIG. 5 illustrates an example flow diagram for a carwash reporting process of one embodiment of the present disclosure.

Referring to FIG. 5, an example flow diagram for a carwash reporting process 500 of one embodiment of the present disclosure is illustrated. With continuing reference to FIGS. 1 to 4, at operation 502, the computing platform 104 detects the vehicle 102 has arrived in the recommended carwash station selected described above with reference to FIG. 4. For instance, the computing platform 104 may use location data from the GNSS controller 124 matching a coordinate of the carwash station on a map to detect the vehicle 102 has arrived. At operation 504, the computing platform starts a clock to measure duration of time for the carwash service. At operation 506, the camera 182 captures an image and the computing platform 104 analyzes the image to determine if the vehicle has been washed. If the computing platform 104 determines the camera is clean indicating the vehicle 102 has been washed, the process proceeds to operation 510 and the computing platform 104 stops the clock and measures the time elapsed to determine the service time at the carwash station. In case that the vehicle 102 provided with an automatic payment system (e.g. using NFC or RFID technologies), the carwash payment may be automatically processed within a payment transaction range. In this case, the service time may be measured between the payment transaction and carwash complete based in the camera image quality. The computing platform 104 may be further configured to determine the wash quality by analyzing the quality of image captured by the camera 182 using algorithms. At operation 512, the computing platform 103 asks the user to rate the carwash experience (e.g. from one to five starts) and receives user input for the rating score. responsive to receiving the rating, at operation 514, the computing platform 104 sends a feedback message to the server to update the status and information about the recommended carwash station. The feedback message may include the measured service time, quality of wash, and the customer rating as a few non-limiting examples.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
a camera configured to capture an image; and
a controller programmed to
analyze quality of the image to calculate a lens cleanliness,
responsive to detecting the lens cleanliness being below a predefined threshold, identify a carwash station within a predefined distance from a navigation route by matching a carwash preference with a status of the carwash station downloaded from a server,
indicate the carwash station to a vehicle user,
responsive to receiving user input selecting the carwash station, set the carwash station as a navigation destination,
responsive to detecting the vehicle arrives at the carwash station as selected, start a clock, and continue to analyze quality of images captured by the camera until the lens cleanliness as calculated is above the predefined threshold to stop the clock, and
measure a service time between the clock start and stop.

2. The vehicle of claim 1, wherein the carwash preference has multiple entries including at least one of: a washing technology entry, a waiting time entry, an other services entry, a rating entry, or a calendar access entry.

3. The vehicle of claim 2, wherein the carwash preference is stored locally in a vehicle storage.

4. The vehicle of claim 2, wherein the carwash preference is received from at least one of: a mobile device or a cloud server.

5. The vehicle of claim 2, wherein the controller is further programmed to
upload the service time as measured to the server to update the status of the carwash station.

6. The vehicle of claim 2, wherein the controller is further programmed to
continue to capture images by the camera after the clock stops and analyze the quality of images after the clock stops to calculate a wash quality.

7. The vehicle of claim 5, wherein the controller is further programmed to
receive a rating score for the user to rate user experience for the carwash station.

8. The vehicle of claim 7, wherein the controller is further programmed to
upload wash quality and rating score to the server to update the status of the carwash station.

9. A system for a vehicle, comprising:
a camera having a lens exterior to the vehicle, configured to capture images through the lens;
a telematics control unit (TCU) configured to communicate with a server via a wireless connection; and
one or more processors configured to
responsive to receiving images from the camera, analyze a quality of the images to calculate a lens cleanliness value,
responsive to detecting the lens cleanliness value being below a predefined threshold, identify a plurality of carwash stations within a predefined distance from a navigation route,
download status of the carwash stations as identified from the server via the TCU,
select a carwash station as identified by matching a carwash preference with status of the carwash stations,
responsive to finding a match, indicate the carwash station as selected to a vehicle user,
responsive to receiving user input selecting the carwash station, set the carwash station as a navigation destination,
responsive to detecting the vehicle arrives at the carwash station as selected, start a clock, and continue to analyze quality of images captured by the camera until the lens cleanliness value as calculated is above the predefined threshold to stop the clock, and
measure a service time between the clock start and stop.

10. The system of claim 9, wherein the navigation route is calculated based on at least one of: a travel history of the vehicle, or a calendar event of a user associated with the vehicle.

11. The system of claim 9, wherein the carwash preference includes multiple entries having at least one of: a washing technology entry, a waiting time entry, an other services entry, a rating entry, or a calendar access entry.

12. The system of claim 9, wherein the carwash preference is received from a mobile device connected to the vehicle via a wireless connection using at least one of the following technologies: Wi-Fi, Bluetooth, radio-frequency identification (RFID), or near-field communication (NFC).

13. The system of claim 9, wherein the carwash preference is received from a cloud server via the TCU.

14. The system of claim 9, wherein the one or more processors are further configured to
report the service time to the server to update the status of the carwash station as selected.

15. A method for a vehicle, comprising:
responsive to detecting the vehicle arrives at a carwash station set as a navigation destination, starting a clock;
capturing images via a camera exterior to vehicle cabin;
responsive to detecting a lens cleanliness is above a predefined threshold indicative of a carwash has been performed, measuring a service time elapsed since the vehicle arrives at the carwash station; and
report the service time to a server via a telematics control unit (TCU) through a wireless connection.

16. The method of claim 15, further comprising:
responsive to detecting a fuel level of the vehicle is below a predefined threshold and the carwash station is associated with a fueling station, recommend a user of the vehicle to refuel at the fueling station.

17. The method of claim 16, further comprising:
identifying the carwash station to be associated with the fueling station; and
setting the carwash station to be the navigation destination based on a carwash preference in favor of carwash stations attached to fueling stations.

18. The method of claim 17, wherein the carwash preference includes a waiting time entry specifying a maximum time that the user is willing to wait at the carwash station.

* * * * *